(12) United States Patent
Kuan et al.

(10) Patent No.: US 7,038,739 B2
(45) Date of Patent: May 2, 2006

(54) OPTICAL PROJECTION SYSTEM

(75) Inventors: Da-Shuang Kuan, Hsinchu County (TW); Tony Whitehead, Hsinchu (TW); Chia-Tsung Chan, Taoyuan County (TW); Chia-Te Lin, Chiayi County (TW)

(73) Assignee: United Microelectronics Corp., Hsinchu (TW)

( * ) Notice: Subject to any disclaimer, the term of this patent is extended or adjusted under 35 U.S.C. 154(b) by 82 days.

(21) Appl. No.: 10/886,844

(22) Filed: Jul. 7, 2004

(65) Prior Publication Data
US 2006/0007364 A1    Jan. 12, 2006

(51) Int. Cl.
*G02F 1/1335*    (2006.01)

(52) U.S. Cl. .................................. 349/8; 353/34

(58) Field of Classification Search ............... 349/7–9; 353/20, 31, 34
See application file for complete search history.

(56) References Cited

U.S. PATENT DOCUMENTS

| | | | |
|---|---|---|---|
| 6,227,671 B1* | 5/2001 | Haba | 349/5 |
| 2004/0114235 A1* | 6/2004 | Sedlmayr | 349/9 |

* cited by examiner

*Primary Examiner*—James A. Dudek

(57) ABSTRACT

An optical projection system comprising a light source, a beam splitter module, a plurality of spatial light modulators, an optical combiner module and a projection lens is provided. The light source is used for providing a first white light. The beam splitter module is disposed in the light path of the first white light to separate the first white light into a plurality of second white lights. The spatial light modulators are disposed in the light paths of the second white lights respectively. Each spatial light modulator comprises a color filter to modulate each second white light into a color light carrying with corresponding color image signal. The optical combiner module is disposed in the light paths of the color lights to combine the color lights. The projection lens is disposed in the light path of the combined color lights after the optical combiner module to project the combined color light to be an image.

8 Claims, 2 Drawing Sheets

OPTICAL PROJECTION SYSTEM

BACKGROUND OF THE INVENTION

1. Field of the Invention

The present invention relates to an optical projection system. More particularly, the present invention relates to an optical projection system having a simplified design.

2. Description of Related Art

Recently, the technology of liquid crystal display (LCD) has been broadly applied in a variety of electronic devices such as liquid crystal television, notebook, desktop computer, or liquid crystal projector. Specially, the liquid crystal projector is developed for displaying large size image. Therefore, the image resolution of the liquid crystal projector is dependent on the liquid crystal panel adopted therein, and generally a high resolution liquid crystal panel is provided.

The liquid crystal panel used in the conventional liquid crystal projector generally includes a liquid crystal display component constructed on a glass substrate or a silicon substrate. In general, the thin film transistor (TFT) or metal oxide semiconductor (MOS) transistor is provided as an active component of the liquid crystal panel. The active component is used to drive the liquid crystal via the pixel electrodes electrically connected thereto for displaying the image. Since the liquid crystal panel that constructed on the glass substrate or the silicon substrate has a small size and high resolution, the size of the liquid crystal projector may be reduced. In general, the performance of the liquid crystal projector is highly dependent on the design of the optical projection system.

Hereinafter, the principle of image projection of a conventional liquid crystal projector will be described. For example, in an optical projection system of a conventional reflecting type liquid crystal projector, a white light is provided by a light source. Then, the white light is separated by a dichroic mirror into red light, which transmits through the dichroic mirror and a light having a mixture of blue and green lights which is reflected by the dichroic mirror. Thereafter, the transmitted red light is separated into an S polarized red light and a P polarized red light by a polarization beam splitter. The S polarized (or P polarized) red light is incident to a red-light liquid crystal panel, which is then reflected and modulated to carry a red image signal. On the other hand, the light having mixture of blue and green lights is separated by a color separation mirror into a green light, which is reflected by the separation mirror and a blue light, which is transmitted through the color separation mirror. The reflected green light is separated into S polarized and P polarized green lights by a polarization beam splitter, and then the S polarized (or P polarized) green light is reflected and modulated by a green-light liquid crystal panel. In the same way, the transmitted blue light is separated into S polarized and P polarized blue light via a polarization beam splitter, and then the S polarized (or P polarized) blue light is reflected and modulated by a blue-light liquid crystal panel. Thereafter, the modulated red, green and blue light having a red, green and blue image signals respectively are incident into an X-cube dichroic prism and are combined therein. Finally, an image is outputted, which can be projected to the screen via a projection lens.

Accordingly, in the conventional optical projection system, a white light is provided by a light source, and then the white light is separated into red light, green light and blue light by dichroic mirrors. Then, the red light, green light and blue light are modulated to carry the red, green and blue image signals via three liquid crystal panels respectively. Finally, these image signals are combined by the X-cube dichroic prism to output an image and projected by the projection lens. However, since the light is separated by dichroic mirrors and combined by dichroic prism, the cost of the projector is high and the design of the light path is complex.

SUMMARY OF THE INVENTION

Therefore, the present invention is directed to an optical projection system for reducing the design, the cost and the process time.

According to one embodiment of the present invention, an optical projection system comprising, for example but not limited to, a light source, a beam splitter module, a plurality of spatial light modulators, an optical combiner module and a projection lens is provided. The light source is used for providing a first white light. The beam splitter module is disposed in the light path of the first white light to separate the first white light into a plurality of second white lights. The spatial light modulators are disposed in the light paths of the second white lights respectively. Each spatial light modulator comprises a color filter to modulate each second white light into a color light carrying with corresponding color image signal. The optical combiner module is disposed in the light paths of the color lights to combine the color lights. The projection lens is disposed in the light path of the combined color lights after the optical combiner module to project the combined color light, which is displayed as an image.

In one embodiment of the present invention, the beam splitter module at least comprises, for example but not limited to, a broadband beam splitter. The spatial light modulator comprises, for example but not limited to, a reflecting type spatial light modulator or a transmission type spatial light modulator. The spatial light modulator comprises, for example but not limited to, a liquid crystal panel. The color filter comprises, for example but not limited to, a dye-based color filter. The color filter comprises, for example but not limited to, a red color filter, a green color filter or a blue color filter. The optical combiner module comprises, for example but not limited to, a X-cube dichroic prism.

Accordingly, in the optical projection system according to an embodiment of the present invention, the spatial light modulator comprising the color filter is adapted for separating colors. Therefore, the dichroic mirror of the conventional optical projection system may be replaced, and thus the design is simplified, the cost and the process time are reduced. Further, the technology of fabricating the color filter on the spatial light modulator is well developed and therefore this will not increase the cost, process time and complexity.

It is to be understood that both the foregoing general description and the following detailed description are exemplary, and are intended to provide further explanation of the invention as claimed.

BRIEF DESCRIPTION OF THE DRAWINGS

The accompanying drawings are intended to provide further understanding of the invention, and are incorporated in and constitute a part of this specification. The drawings illustrate embodiments of the invention and, together with the description, serve to explain the principles of the invention.

DESCRIPTION OF THE EMBODIMENTS

The present invention is described in detail hereinafter with reference to the accompanying drawings, in which preferred embodiments of the invention are illustrated. The present invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
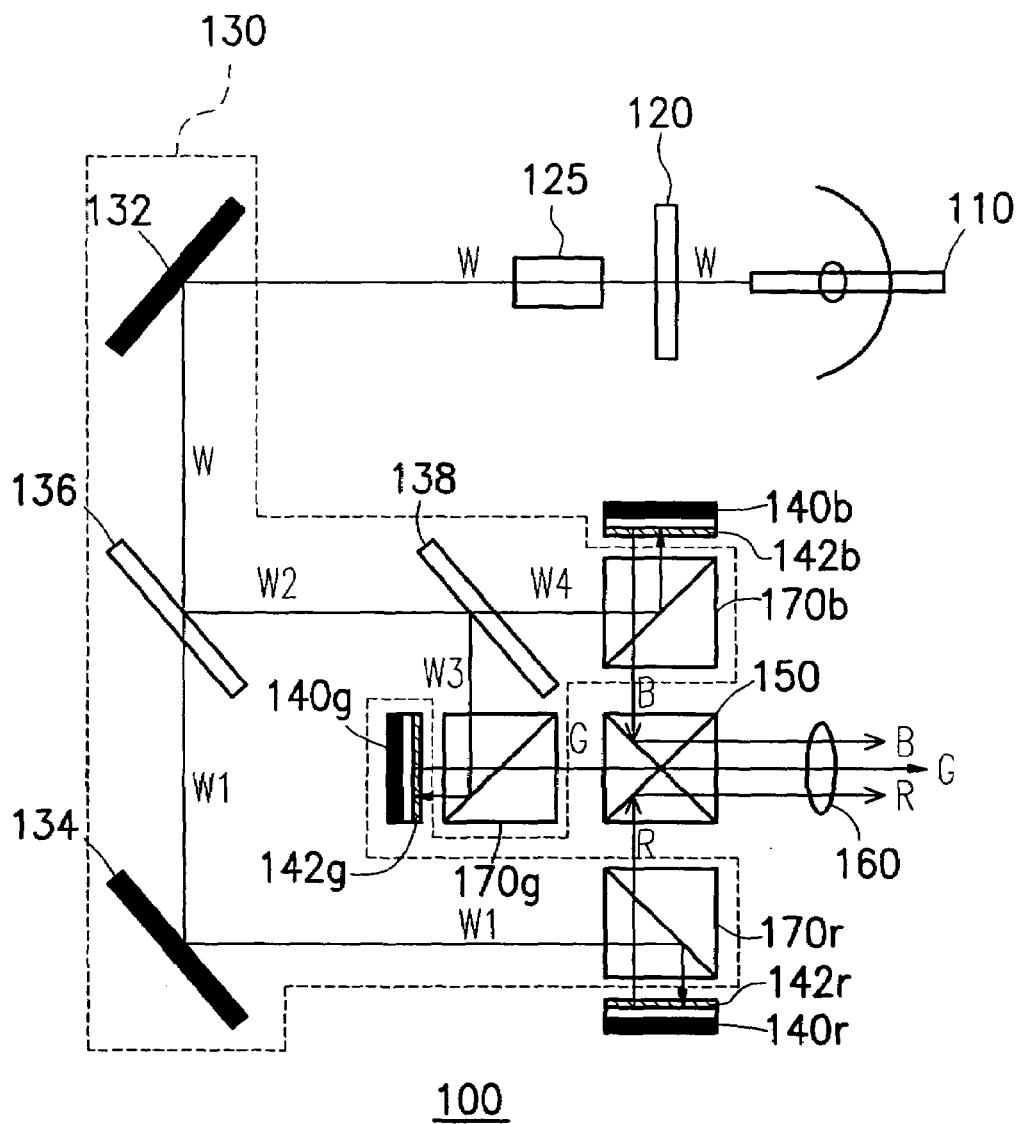
FIG. 1 is a schematic drawing illustrating an optical projection system according to one embodiment of the present invention.

FIG. 1 is a schematic drawing illustrating an optical projection system according to one embodiment of the present invention. Referring to FIG. 1, the optical projection system 100 is illustrated as a reflecting type optical projection system. The optical projection system 100 comprises, for example but not limited to, a light source 110, a beam splitter module 130, a plurality of spatial light modulators 140r, 140g and 140b, an optical combiner module 150 and a projection lens 160. The beam splitter module 130 comprises, for example but not limited to, a broadband beam splitter. Referring to FIG. 1, in the present embodiment, the beam splitter module 130 comprises two reflection mirrors 132 and 134, two broadband beam splitters 136 and 138, and a plurality of polarization beam splitters 170r, 170g and 170b. In addition, the optical projection system 100 further comprises, for example but not limited to, a color filter mirror 120 and a polarization converter 125 (or called an S-P converter).

Referring to FIG. 1, first, a white light W is provided by the light source 110. Then, the color filter mirror 120 is disposed after the light source 110 to filter out the ultraviolet light and the infrared light of the white light W. Thereafter, the polarization of the white light W is totally converted into S polarization by the polarization converter 125. Thereafter, the propagation direction of the white light W is changed by the reflection mirror 132. Then, the converted white light W is separated, for example but not limited to, into a transmitted white light W1 and a reflected white light W2 by the broadband beam splitter 136.

As to the white light W1, the propagation direction of the white light W1 is changed by the reflection mirror 134. Next, the white light W1 is incident into a polarization beam splitter 170r, wherein the ratio of transmission and reflection of the incident light of the light incident to the polarization beam splitter 170r is dependent on the polarization of the incident light. Therefore, the S polarized white light W1 is reflected and incident to the spatial light modulator 140r by the polarization beam splitter 170r. The spatial light modulator 140r comprises, for example but not limited to, a liquid crystal panel comprising a liquid crystal on silicon display panel (LCOS display panel) or a high temperature polysilicon liquid crystal display panel (HTPS LCD panel) on one side of the substrate. In addition, the spatial light modulator 140r comprises a color filter 142r. The color filter 142r comprises, for example but not limited to, a red dye based color filter. The color filter 142r may be formed over a substrate opposite to the silicon substrate, or attached to the surface of the liquid crystal panel. After the white light W1 is incident to the spatial light modulator 140r, the white light W1 is converted to a red light R by the color filter 142r, and then modulated by the liquid crystal panel into a red light R carrying red image signal. It is noted that the polarization of the red light R is changed to, for example but not limited to, P polarization. Thereafter, the P polarized red light R is reflected and passes through the polarization beam splitter 170r.

As to the white light W2, the white light W2 is incident to the broadband beam splitter 138. The white light W2 is separated into, for example but not limited to, a transmitted white light W3 and a reflected white light W4 by the broadband beam splitter 138. Thereafter, the white light W3 is incident to the polarization beam splitter 170g, the spatial light modulator 140g and the polarization beam splitter 170g sequentially, and then converted into a green light G carrying with green image signal. The white light W4 is incident to the polarization beam splitter 170b, the spatial light modulator 140b and the polarization beam splitter 170b sequentially, and then converted into blue light B carrying with blue image signal. Since the construction of the spatial light modulator 140g and the spatial light modulator 140b is similar to that of the spatial light modulator 140r, the detailed description is not repeated again.

Thereafter, the red light R, the green light G and the blue light B are incident to the optical combiner module 150. The optical combiner module 150 comprises, for example but not limited to, an X-cube dichroic prism. Then, the red light R, the green light G and the blue light B are combined and then projected to the screen by the projection lens 160 and displayed as an image on the screen.

Figure 2:
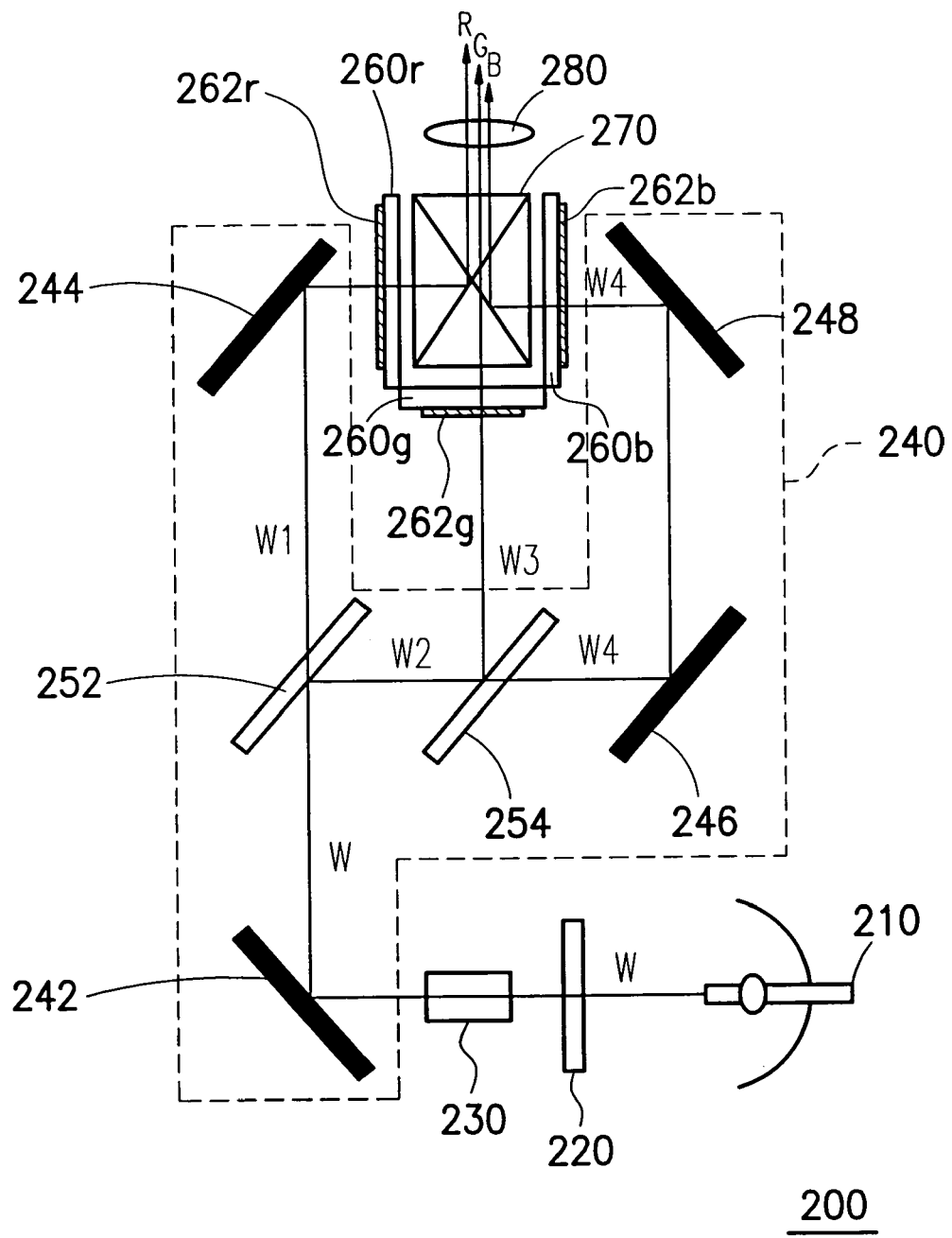
FIG. 2 is a schematic drawing illustrating an optical projection system according to one embodiment of the present invention.

FIG. 2 is a schematic drawing illustrating an optical projection system according to one embodiment of the present invention. Referring to FIG. 2, the optical projection system 200 is illustrated as a transmission type optical projection system. The optical projection system 200 comprises, for example but not limited to, a light source 210, a beam splitter module 240, a plurality of spatial light modulators 260r, 260g and 260b, an optical combiner module 270 and a projection lens 280. The beam splitter module 240 comprises, for example but not limited to, at least a broadband beam splitter. In one embodiment of the present invention, the beam splitter module 240 comprises four reflection mirrors 242, 244, 246 and 248 and two broadband beam splitters 252 and 254. In addition, the optical projection system 100 further comprises, for example but not limited to, a color filter mirror 220 and a polarization converter 230.

Referring to FIG. 2, first, a white light W is provided by the light source 210. Then, the color filter mirror 220 is disposed after the light source 210 to filter out the ultraviolet light and the infrared light of the white light W. Thereafter, the polarization of the white light W is totally converted into S polarization by the polarization converter 230. Then, the propagation direction of the white light W is changed by the reflection mirror 242. Then, the converted white light W is, for example but not limited to, separated into a transmitted white light W1 and a reflected white light W2 by the broadband beam splitter 252.

As to the white light W1, the propagation direction of the white light W1 is changed by the reflection mirror 244. Then, the white light W1 is incident into a spatial light modulator 260r. The spatial light modulator 260r comprises, for example but not limited to, a liquid crystal panel having transparent top and bottom substrates. In addition, the spatial light modulator 260r comprises a color filter 262r. The color filter 262r further comprises, for example but not limited to, a red dye based red color filter. The color filter 262r may be formed in the liquid crystal panel, or attached outside the liquid crystal panel. After the white light W1 is incident to the spatial light modulator 260r, the white light W1 is converted into a red light R by the color filter 262r, and then modulated into a red light R carrying with red image signal by the liquid crystal panel.

As to the white light W2, the white light W2 is incident to the broadband beam splitter 254. The white light W2 is separated into, for example but not limited to, a reflected white light W3 and a transmitted white light W4 by the broadband beam splitter 254. Thereafter, the white light W3 is incident to the spatial light modulator 260g and converted into a green light G carrying with green image signal. The white light W4 is incident to the reflection mirror 246, the reflection mirror 248 and the spatial light modulator 260b sequentially, and then converted into a blue light B carrying with blue image signal. Since the construction of the spatial light modulator 260g and the spatial light modulator 260b is similar to that of the spatial light modulator 260r, the detailed description is not repeated again.

Thereafter, the red light R, the green light G and the blue light B are incident to the optical combiner module 270. The optical combiner module 270 comprises, for example but not limited to, an X-cube dichroic prism. Then, the red light R, the green light G and the blue light B are combined and then projected to the screen by the projection lens 280 and displayed as an image on the screen.

In the embodiments of the invention described above, the broadband beam splitters may be selected and arranged to properly to adjust the ratio of the energy of the white lights W1, W3 and W4 to the energy of the white light W. Therefore, the quality of the color of the image may be optimized.

It should be noted that, in the present invention, the dichroic mirror of the conventional optical projection system can be replaced by a spatial light modulator for filtering and separating color lights. Therefore, the design of the optical projection system is simplified and the cost is reduced. Furthermore, the scope of the invention is not limited by the embodiments described above, any invention comprising the spatial light modulator instead of the dichroic mirror falls within the scope of the invention.

Accordingly, in optical projection system of the present invention, the color separation of the white light is not performed by the beam splitter module. The beam splitter module of the present invention is provided for separating the white light emitted by the light source into three white lights. After the three white lights are incident to the corresponding spatial light modulators respectively, the three white lights are converted into three color lights by the color filters of the spatial light modulators. And then the three color lights are modulated to carry the corresponding color images by the spatial light modulators respectively. Therefore, in beam splitter module, the cost on the components such as the conventional color separation mirrors can be saved, and the design and the fabrication of the beam splitter module can be simplified. Further, the technology of fabricating the color filter on the spatial light modulator is well developed and this will not increase the cost, process time and complexity.

It will be apparent to those skilled in the art that various modifications and variations can be made to the structure of the present invention without changing the scope or departing from the spirit of the present invention. In view of the foregoing, it is intended that the present invention cover modifications and variations of this invention provided they fall within the scope of the following claims and their equivalents.

What is claimed is:

1. An optical projection system, comprising:
   a light source, for providing a first white light;
   a beam splitter module, disposed in a light path of the first white light to separate the first white light into a plurality of second white lights;
   a plurality of spatial light modulators, each disposed in a light path of each of the second white lights respectively, wherein each of the spatial light modulators comprises a color filter respectively to modulate the second white light incident therein into a plurality of color lights carrying a plurality of image signals;
   an optical combiner module, disposed in light paths of the color lights to combine the color lights; and
   a projection lens, disposed in a light path of the combined color lights after the optical combiner module to project an image of the combined color lights.

2. The system of claim 1, wherein the beam splitter module comprises at least a broadband beam splitter.

3. The system of claim 1, wherein the color filter comprises a dye-based color filter.

4. The system of claim 1, wherein the spatial light modulator comprises a reflecting type spatial light modulator.

5. The system of claim 1, wherein the spatial light modulator comprises a transmission type spatial light modulator.

6. The system of claim 1, wherein the spatial light modulator comprises a liquid crystal panel.

7. The system of claim 1, wherein the color filter comprises a red color filter, a green color filter or a blue color filter.

8. The system of claim 1, wherein the optical combiner module comprises at least an X-cube dichroic prism.

* * * * *